United States Patent
Zeng et al.

(10) Patent No.: US 6,381,349 B1
(45) Date of Patent: Apr. 30, 2002

(54) PROJECTOR/BACKPROJECTOR WITH SLICE-TO-SLICE BLURRING FOR EFFICIENT 3D SCATTER MODELING

(75) Inventors: Gengsheng Lawrence Zeng; Chuanyong Bai; Grant T. Gullberg, all of Salt Lake City, UT (US)

(73) Assignee: The University of Utah, Salt Lake City, UT (US)

( * ) Notice: Subject to any disclaimer, the term of this patent is extended or adjusted under 35 U.S.C. 154(b) by 0 days.

(21) Appl. No.: 09/189,686

(22) Filed: Nov. 10, 1998

Related U.S. Application Data
(60) Provisional application No. 60/065,583, filed on Nov. 12, 1997.

(51) Int. Cl.$^7$ ................................................ G06K 9/00
(52) U.S. Cl. ...................................................... 382/128
(58) Field of Search .................................. 382/128, 129, 382/130, 131, 132; 250/363.04; 358/75; 342/25; 364/413.04; 324/307; 378/4, 98.3, 98.4, 95, 87

(56) References Cited

U.S. PATENT DOCUMENTS

| | | | |
|---|---|---|---|
| 4,926,251 A | * 5/1990 | Sekizawa et al. | 358/75 |
| 5,081,581 A | * 1/1992 | Koral et al. | 364/413.24 |
| 5,210,421 A | 5/1993 | Gullberg et al. | 250/363 |
| 5,224,037 A | * 6/1993 | Jones et al. | 364/413.19 |
| 5,273,632 A | * 12/1993 | Stockham et al. | 204/450 |
| 5,313,210 A | * 5/1994 | Gail | 342/25 |
| 5,559,335 A | * 9/1996 | Zeng et al. | 250/363.04 |
| 5,878,108 A | * 3/1999 | Baba et al. | 378/98.4 |
| 5,903,008 A | * 5/1999 | Li | 250/363.04 |
| 5,969,524 A | * 10/1999 | Pierpaoli et al. | 324/307 |
| 6,018,565 A | * 1/2000 | Ergun et al. | 378/95 |

OTHER PUBLICATIONS

Z. Liang, et al., "Simultaneous Compensation for Attenuation, Scatter and Detector response for SPECT Reconstruction in Three Dimensions," *Phys. Med. Biol.*, vol. 37, pp. 587–603, 1992.

A. T. Riaku, et al., "Photon Propagation and Detection in Single–Photon Emission Computed Tomography—an Analytic Approach," *Med. Phys.*, vol. 21, p. 1311–1321, 1994.

A. T. Riaku, et al., "Experimental and Numerical Investigation of the 3D SPECT Photon Detection Kernel for Non–Uniform Attenuating Media," *Phys. Med. Biol.*, vol. 41, pp. 1167–1189, 1996.

R. G. Wells, et al., "Experimental Validation of an Analytical Method of Calculating SPECT Projection Data," *IEEE Trans. Nucl. Sci.*, vol. 44, pp. 1283–1290, 1997.

(List continued on next page.)

*Primary Examiner*—Leo Boudreau
*Assistant Examiner*—Abolfazl Tabatabai
(74) *Attorney, Agent, or Firm*—Fay, Sharpe, Fagan, Minnich & McKee, LLP

(57) ABSTRACT

A method of modeling 3D first-order scatter, non-uniform attenuation, and 3D system geometric point response in an ML-EM algorithm to reconstruction SPECT data is provided. It includes performing an initial slice-to-slice blurring operation (112) on a volume of estimated emission source data. The volume of estimated emission source data is represented by a 3D array of voxels. A voxel-by-voxel multiplying (114) of the results from the initial slice-to-slice blurring operation (112) by a volume of attenuation coefficients yields a volume of effective scatter source data (116). The volume of effective scatter source data (116) is voxel-by-voxel added (118) to the volume of estimated emission source data to produce a volume of combined estimated emission and scatter source data. Finally, a secondary slice-to-slice blurring operation (120) is performed on the volume of combined estimated emission and scatter source data.

16 Claims, 3 Drawing Sheets

OTHER PUBLICATIONS

B. Axelsson, et al., "Subtraction of Compton–Scattered Photons in Single–Photon Emission Computed Tomography," *J. Nucl. Med.*, vol. 25, pp. 490–494, 1984.

R. J. Jaszczak, et al., "Improved SPECT Quantification Using Compensation for Scattered Photons," *J. Nucl. Med.*, vol. 25, pp. 893–900, 1984.

K. F. Koral, et al., "SPECT Dual–Energy Window Compton Correction: Scatter Multiplier Required for Quantification," *J. Nucl. Med.*, vol. 31, pp. 90–98, 1990.

K. Ogawa, et al., "A Practical Method for Position–Dependent Compton–Scatter Correction in SPECT," *IEEE Trans. Med. Imag.*, vol. 10, pp. 408–412, 1991.

M. A. King, et al., "A Dual Photo–Peak Window Method for Scatter Correction," *J. Nucl. Med.*, vol. 33, pp. 605–612, 1992.

D. R. Gilland, et al., "A 3D Model of Non–Uniform Attenuation and Detector Response Compensation for Efficient Reconstruction in SPECT," *Phys. Med. Biol.*, vol. 39, pp. 547–561, 1994.

J. E. Bowsher, et al., "Bayesian Reconstruction and Use of Anatomical a Priori Information for Emission Tomography," *IEEE Trans. Med. Imag.*, vol. 15, pp. 673–686, 1996.

C. E. Floyd, et al., "Maximum Likelihood Reconstruction for SPECT with Monte Carlo Modeling: Asymptotic Behavior," *IEEE Trans. Nucl. Sci.*, vol. 34, pp. 285–287, 1987.

J. E. Bowsher, et al., "Treatment of Compton Scattering in Maximum–Likelihood, Expectation–Maximization Reconstructions of SPECT Images," *J. Nucl. Med.*, vol. 32, pp. 1285–1291, 1991.

E. C. Frey, et al., "Modeling the Scatter Response Function in Inhomogeneous Scattering Media for SPECT," *IEEE Trans. Nucl. Sci.*, vol. 41, pp. 1585–1593, 1994.

A. Welch, et al., "A Transmission–Map–Based Scatter Correction Technique for SPECT in Inhomogeneous Media," *Med. Phys.*, vol. 22, pp. 1627–1635, 1995.

F. J. Beekman, et al., "Improved SPECT Quantitation Using Fully 3D Iterative Spatially Variant Scatter Response Compensation," *IEEE Trans. Med. Imag.*, vol. 15, pp. 491–499, 1996.

F. J. Beekman, et al., "Scatter Compensation Methods in 3D Iterative SPECT Reconstruction: A Simulation Study," *Phys. Med. Biol.*, vol. 42, pp. 1619–1632, 1997.

C. H. Tung, et al., "Non–Uniform Attenuation Correction Using Simultaneous Transmission and Emission Converging Tomography," *IEEE Trans. Nucl. Sci.*, vol. 39, pp. 1134–1143, 1992.

Z. Liang, et al., "Reprojection and Backprojection in SPECT Image Reconstruction," *Proc. IEEE Energy Inform. Technol. Southeast*, vol. EITS–1, pp. 919–926, 1989.

A. W. McCarthy, et al., "Maximum Likelihood SPECT in Clinical Computation Times Using Mesh–Connected Parallel Computers," *IEEE Trans. Med. Imag.*, vol. 10, pp. 426–436, 1991.

G. L. Zeng, et al., "Iterative Reconstruction of Fluorine–18 SPECT Using Geometric Point Response Correction," *J. Nucl. Med.*, vol. 39, pp. 124–130, 1998.

J. W. Wallis, et al., "Rapid 3–D Projection in Iterative Reconstruction Using Gaussian Diffusion," *J. Nucl. Med.*, vol. 37, p. 63P, 1996.

C. E. Floyd, et al., "Energy and Spatial Distribution of Multiple Order Compton Scatter in SPECT: A Monte Carlo Investigation," *Phys. Med. Biol.*, vol. 29, pp. 1217–1230, 1984.

H. M. Hudson and R. S. Larkin, "Accelerated EM Reconstruction Using Ordered Subsets of Projection Data," *IEEE Trans. Med. Imag.*, vol. 13, pp. 601–609, 1994.

G. L. Zeng, et al., "Three–Dimensional Iterative Reconstruction Algorithms with Attenuation and Geometric Point Response Correction," *IEEE Trans. Nucl. Sci.*, vol. 38, pp. 693–702, 1991.

G. L. Zeng, et al., "A Projector/Backprojector With Slice–to–Slice Blurring for Efficient 3D Scatter Modeling," *1997 IEEE Nuclear Science Scymposium and Medical Imaging Conference*, Albuquerque, New Mexico, Nov. 2–15, 1997 (Abstract).

* cited by examiner

PROJECTOR/BACKPROJECTOR WITH SLICE-TO-SLICE BLURRING FOR EFFICIENT 3D SCATTER MODELING

This application claims the benefit of U.S. Provisional Application No. 60/065,583 filed Nov. 12, 1997.

BACKGROUND OF THE INVENTION

The present invention relates to the art of diagnostic nuclear imaging. It finds particular application in conjunction with gamma cameras and single photon emission computed tomography (SPECT), and will be described with particular reference thereto. However, it is to be appreciated that the present invention is also amenable to other like applications.

Diagnostic nuclear imaging, is used to study a radionuclide distribution in a subject. Typically, in SPECT, one or more radiopharmaceuticals or radioisotopes are injected into a subject. The radiopharmaceuticals are commonly injected into the subject's blood stream for imaging the circulatory system or for imaging specific organs which absorb the injected radiopharmaceuticals. One or more gamma or scintillation camera detector heads, typically including a collimator, are placed adjacent to a surface of the subject to monitor and record emitted radiation. The camera heads typically include a scintillation crystal which produces a flash or scintillation of light each time it is struck by radiation emanating from the radioactive dye in the subject. An array of photomultiplier tubes and associated circuitry produce an output signal which is indicative of the (x, y) position of each scintillation on the crystal. Often, the heads are rotated or indexed around the subject to monitor the emitted radiation from a plurality of directions to obtain a plurality of different views. The monitored radiation data from the plurality of views is reconstructed into a three dimensional (3D) image representation of the radiopharmaceutical distribution within the subject.

One of the problems with this imaging technique is that photon absorption and scatter (i.e., Compton scattering) by portions of the subject between the emitting radionuclide and the camera head distort the resultant image. One solution for compensating for photon attenuation is to assume uniform photon attenuation throughout the subject. That is, the subject is assumed to be completely homogenous in terms of radiation attenuation with no distinction made for bone, soft tissue, lung, etc. This enables attenuation estimates to be made based on the surface contour of the subject. Of course, human subjects do not cause uniform radiation attenuation, especially in the chest.

In order to obtain more accurate radiation attenuation measurements, a direct measurement is made using transmission computed tomography techniques. In this technique, radiation is projected from a radiation source through the subject. The transmission radiation is received by detectors at the opposite side. The source and detectors are rotated to collect transmission data concurrently with the emission data through a multiplicity of angles. This transmission data is reconstructed into an image representation or attenuation map using conventional tomography algorithms. The radiation attenuation properties of the subject from the transmission computed tomography image are used to correct for radiation attenuation in the emission data. See, for example, U.S. Pat. Nos. 5,210,421 and 5,559,335, commonly assigned and incorporated herein by reference.

To assure that the radiation comes along a known path through or from the subject, collimators are often placed in front of radiation-receiving faces of the detector heads. The collimators typically include a grid of lead vanes which assure that received radiation is traveling along a path from the subject substantially perpendicular to the radiation-receiving faces of the detector heads.

Other collimators have been developed to "magnify" regions of interest. In a cone-beam collimator, the vanes are tapered or angled such that all the vanes point at a common focal point. Radiation reaching the radiation-receiving faces of the detector heads is constrained by the cone-beam collimator to radiation traveling along divergent paths in two directions such that the entire radiation-receiving face of the detector head is used to examine a relatively small region of interest. This magnification improves the resolution in two planar dimensions. Rather than magnifying in two dimensions, fan-beam collimators have also been developed which magnify in one dimension. That is, the vanes are oriented such that the vanes focus the radiation on a focal line, rather than a focal point.

The collimators introduce a system geometric point response that is spatially varying and deteriorates with distance from the face of the collimator. This results in shape distortions and nonuniform density variations in images reconstructed from projection data obtained from a SPECT imaging system. The system geometric point response is dependant on the point source location and collimator geometry. See, for example, G. L. Zeng, et al., "Three-Dimensional Iterative Reconstruction Algorithms with Attenuation and Geometric Point Response Correction," *IEEE Trans. Nucl. Sci.*, Vol. 38, pp. 693–702, 1991.

Scatter correction is an important factor in reconstructing accurate images from SPECT data. Scatter correction techniques, such as multiple-window subtraction and intrinsic modeling with iterative algorithms, have been under study for many years. In fact, methods have been developed for scatter correction in SPECT. See, for example: Z. Liang, et al., "Simultaneous Compensation for Attenuation, Scatter and Detector response for SPECT Reconstruction in Three Dimensions," *Phys. Med. Biol.*, Vol. 37, pp. 587–603, 1992; A. T. Riaku, et al., "Photon Propagation and Detection in Single-Photon Emission Computed Tomography—an Analytic Approach," *Med. Phys.*, Vol. 21, p. 1311–1321, 1994; A. T. Riaku, et al., "Experimental and Numerical Investigation of the 3D SPECT Photon Detection Kernel for Non-Uniform Attenuating Media," *Phys. Med. Biol.*, Vol. 41, pp. 1167–1189, 1996; and, R. G. Wells, et al., "Experimental Validation of an Analytical Method of Calculating SPECT Projection Data," *IEEE Trans. Nucl. Sci.*, Vol. 44, pp. 1283–1290, 1997. Methods that use multiple acquisition energy windows to estimate the scattered photons and subtract the estimated photons from the projection data have found applications in research and clinical studies. See, for example: B. Axelsson, et al., "Subtraction of Compton-Scattered Photons in Single-Photon Emission Computed Tomography," *J. Nucl. Med.*, Vol. 25, pp. 490–494, 1984; R. J. Jaszczak, et al., "Improved SPECT Quantification Using Compensation for Scattered Photons," *J. Nucl. Med.*, Vol. 25, pp. 893–900, 1984; K. F. Koral, et al., "SPECT Dual-Energy Window Compton Correction: Scatter Multiplier Required for Quantification," *J. Nucl. Med.*, Vol. 31, pp. 90–98, 1990; K. Ogawa, et al., "A Practical Method for Position-Dependent Compton-Scatter Correction in SPECT," *IEEE Trans. Med. Imag.*, Vol. 10, pp. 408–412, 1991; M. A. King, et al., "A Dual Photo-Peak Window Method for Scatter Correction," *J. Nucl. Med.*, Vol. 33, pp. 605–612, 1992; and, D. R. Gilland, et al., "A 3D Model of Non-Uniform Attenuation and Detector Response Compensation for Efficient Reconstruction in SPECT," *Phys. Med. Biol.*, Vol. 39, pp. 547–561, 1994. These pre-processing methods are efficient and effective, but the pre-subtracting methods tend to increase noise and may introduce negative or zero values at locations where projection values are positive. An alternative method to avoid subtraction is to add estimated scatter events to forward projections of the current reconstructed image in an iterative algorithm. See, for example, J. E. Bowsher, et al., "Bayesian Reconstruction and Use of Anatomical a Priori Information for Emission Tomography," *IEEE Trans. Med. Imag.*, Vol. 15, pp. 673–686, 1996. However, subtracting or adding data tends to increase the noise level in the data. Iterative reconstruction methods can model scatter physics in the projector/backprojector and have been shown to provide more accurate reconstructions than subtracting/adding methods. See, for example: C. E. Floyd, et al., "Maximum Likelihood Reconstruction for SPECT with Monte Carlo Modeling: Asymptotic Behavior," *IEEE Trans. Nucl. Sci.*, Vol. 34, pp. 285–287, 1987; J. E. Bowsher, et al., "Treatment of Compton Scattering in Maximum-Likelihood, Expectation-Maximization Reconstructions of SPECT Images," *J. Nucl. Med.*, Vol. 32, pp. 1285–1291, 1991; E. C. Frey, et al., "Modeling the Scatter Response Function in Inhomogeneous Scattering Media for SPECT," *IEEE Trans. Nucl. Sci.*, Vol. 41, pp. 1585–1593, 1994; A. Welch, et al., "A Transmission-Map-Based Scatter Correction Technique for SPECT in Inhomogeneous Media," *Med. Phys.*, Vol. 22, pp. 1627–1635, 1995; F. J. Beekman, et al., "Improved Quantitation in SPECT Imaging Using Fully 3D Iterative Spatially Variant Scatter Compensation," *IEEE Trans. Med. Imag.*, Vol. 15, pp. 491–499, 1996; and, F. J. Beekman, et al., "Scatter Compensation Methods in 3D Iterative SPECT Reconstruction: A Simulation Study," *Phys. Med. Biol.*, Vol. 42, pp. 1619–1632, 1997. These iterative methods use spatially variant scatter point response functions within the projector/backprojector. Nevertheless, pre-storing a complete set of scatter point response functions for each patient is not feasible in practice. Research has been done to approximate the response functions in an object by the water equivalent depth method. See, for example, E. C. Frey, et al., 1994; and, F. J. Beekman, et al., 1996. However, these approximation methods are still not efficient, and do not work well for non-uniform objects.

It has been demonstrated that a slice-to-slice blurring projector/backprojector is efficient and effective when used in an iterative maximum likelihood expectation maximization (ML-EM) algorithm. See, for example: A. W. McCarthy, et al., "Maximum Likelihood SPECT in Clinical Computation Times Using Mesh-Connected Parallel Computers," *IEEE Trans. Med. Imag.*, Vol. 10, pp. 426–436, 1991; G. L. Zeng, et al., "Iterative Reconstruction of Fluorine-18 SPECT Using Geometric Point Response Correction," *J. Nucl. Med.*, Vol. 39, pp. 124–130, 1998; and, J. W. Wallis, et al., "Rapid 3-D Projection in Iterative Reconstruction Using Gaussian Diffusion," *J. Nucl. Med.*, Vol 37, p. 63P, 1996. Previous developments include, an efficient slice-to-slice blurring technique to model attenuation and system geometric point response in a projector/backprojector pair. The technique uses an ML-EM algorithm to reconstruct SPECT data. However, it fails to address the scatter problem.

When a patient's attenuation map is available via a transmission scan, a Compton scatter point response function can be estimated by the Klein-Nishina formula. See, for example: C. H. Tung, et al., "Non-Uniform Attenuation Correction Using Simultaneous Transmission and Emission Converging Tomography," *IEEE Trans. Nucl. Sci.*, Vol. 39, pp. 1134–1143, 1992; and Z. Liang, et al., "Reprojection and Back Projection in SPECT Image Reconstruction," *Proc. IEEE Enerqy Inform. Technol. Southeast*, Vol. EITS-1, pp. 919–926, 1989. A method to estimate the projections of first-order Compton scatter has been developed. See, for example, A. Welch, et al., 1995. This method gives a fairly accurate estimate of the scattered projections from an inhomogeneous media, and has been implemented two-dimensionally (2D). However, the method is limited to a 2D scatter model. It employs a ray or line tracing technique that is too computationally burdensome and time consuming to be useful in clinical applications for 3D scatter correction.

The present invention contemplates a new and improved technique for efficient 3D scatter modeling which overcomes the above-referenced problems and others.

SUMMARY OF THE INVENTION

In accordance with one aspect of the present invention, a method of modeling 3D first-order scatter, non-uniform attenuation, and 3D system geometric point response in an ML-EM algorithm to reconstruction SPECT data is provided. It includes performing an initial slice-to-slice blurring operation on a volume of estimated emission source data. The volume of estimated emission source data is represented by a 3D array of voxels. A voxel-by-voxel multiplying of the results from the initial slice-to-slice blurring operation by a volume of attenuation coefficients yields a volume of effective scatter source data. The volume of effective scatter source data is voxel-by-voxel added to the volume of estimated emission source data to produce a volume of combined estimated emission and scatter source data. Finally, a secondary slice-to-slice blurring operation is performed on the volume of combined estimated emission and scatter source data.

In accordance with a more limited aspect of the present invention, performing the initial slice-to-slice blurring includes successively convolving parallel slices of the volume of estimated emission source data with respective blurring kernels, and successively adding previously convolved neighboring slices to their immediately following slices prior to that following slices' convolution.

In accordance with a more limited aspect of the present invention, after addition of the previously convolved neighboring slice and before its own convolution, slices are point-by-point multiplied by a 2D array of attenuation factors.

In accordance with a more limited aspect of the present invention, the attenuation factors are exponential functions whose exponent is a negative of a linear attenuation coefficient times a distance between respective voxels.

In accordance with a more limited aspect of the present invention, each convolution is implemented as two orthogonal 1D convolutions.

In accordance with a more limited aspect of the present invention, the convolutions approximate a Gaussian scattering probability which is a function of a scattering angle.

In accordance with a more limited aspect of the present invention, the blurring kernels are estimated from a least-squares fit comparison of calculated results to projections from known point sources taken one point source at a time using Monte Carlo simulations.

In accordance with a more limited aspect of the present invention, performing the secondary slice-to-slice blurring includes successively convolving parallel slices of the volume of combined estimated emission and scatter source data with respective blurring kernels, and successively adding previously convolved neighboring slices to their immediately following slices prior to that following slices' convolution.

In accordance with a more limited aspect of the present invention, the blurring kernels are cross shaped.

In accordance with a more limited aspect of the present invention, the convolutions approximate a system geometric point response function. The system geometric point response function is dependent on physical characteristics of a collimator used during collection of the SPECT data.

In accordance with another aspect of the present invention, a projector/backprojector for use in an image processor employing an EM reconstruction algorithm is provided. It includes a first convolver which successively convolves parallel slices of a volume of image data and adds them to neighboring slices prior to the neighboring slices being convolved. The first convolver employs convolution kernels determined from a Compton scattering function which is a function of a scattering angle. A multiplication processor voxel-by-voxel multiplies a volume of image data from the first convolver by a volume of attenuation coefficients. Again, a second convolver successively convolves parallel slices of a volume of image data from the multiplication processor and adds them to neighboring slices prior to the neighboring slices being convolved. This time, the second convolver employs convolution kernels determined from a system geometric point response function which depends on physical characteristics of a collimator used during collection of measured data.

One advantage of the present invention is its ease of implementation and efficiency.

Another advantage of the present invention is the reduction of imaging artifacts from scattered radiation.

Yet another advantage of the present invention is the reduction of computation time in 3D scatter correction.

Another advantage of the present invention is that it compensates for 3D first-order scatter, non-uniform attenuation, and 3D system geometric point response.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
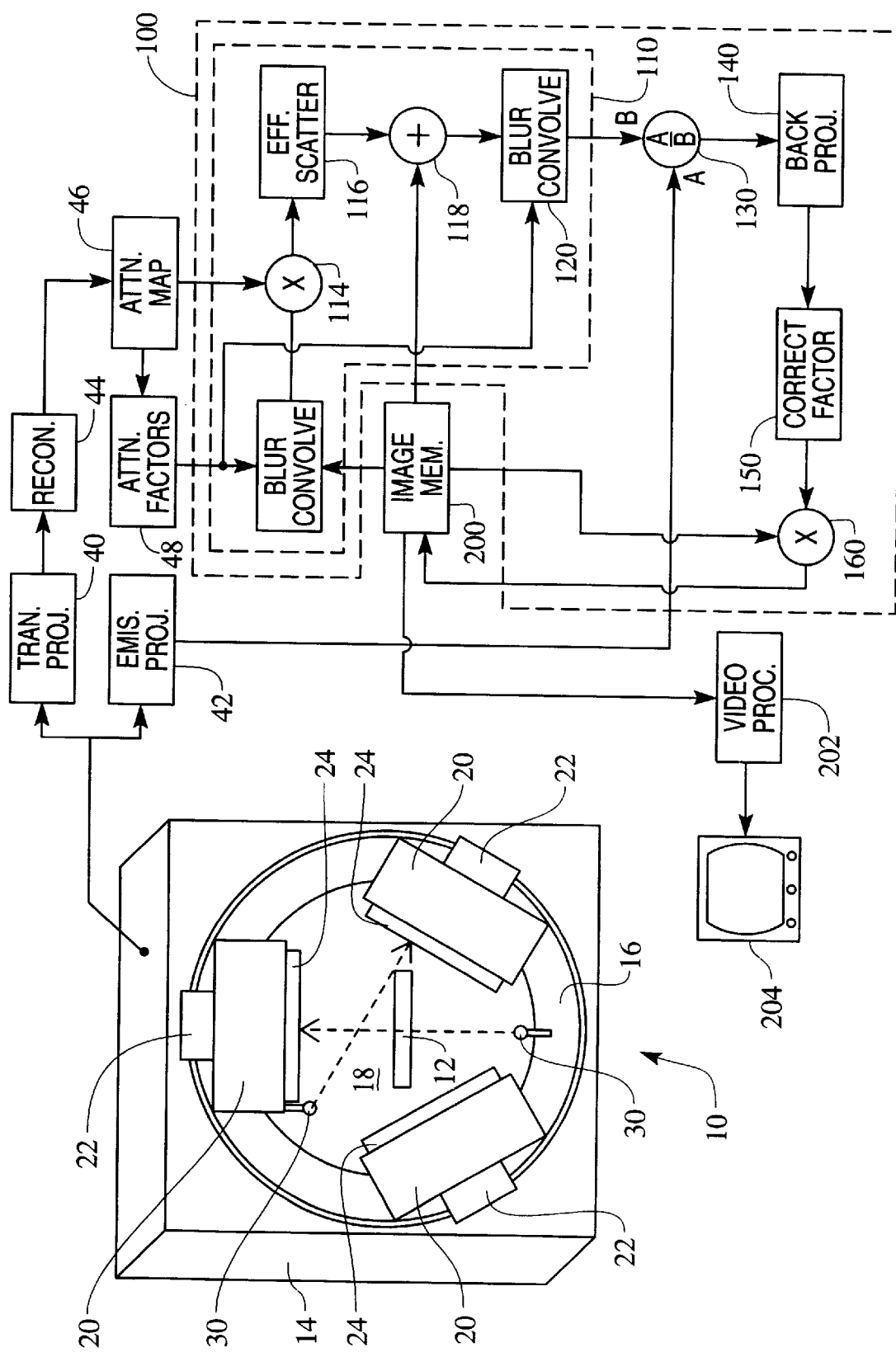
FIG. 1 is a diagrammatic illustration of a nuclear medicine gamma camera in accordance with aspects of the present invention.

With reference to FIG. 1, a diagnostic nuclear imaging apparatus or gamma camera 10 includes a subject support 12, such as a table or couch, which supports a subject being examined and/or imaged such as a phantom or patient. The subject is injected with one or more radiopharmaceuticals or radioisotopes such that emission radiation is emitted therefrom. Optionally, the subject support 12 is selectively height adjustable so as to center the subject at a desired height. A first gantry 14 holds a rotating gantry 16 rotatably mounted thereto. The rotating gantry 16 defines a subject-receiving aperture 18. In a preferred embodiment, the first gantry 14 is advanced toward and/or retracted from the subject support 12 so as to selectively position regions of interest of the subject within the subject-receiving aperture 18. Alternately, the subject support 12 is advanced and/or retracted to achieve the desired positioning of the subject within the subject-receiving aperture 18.

One or more detector heads 20 are adjustably mounted to the rotating gantry 16 with varying degrees of freedom of movement. Optionally, the detector heads 20 are circumferentially adjustable to vary their spacing on the rotating gantry 16. Separate translation devices 22, such as motors and drive assemblies (not shown), independently translate the detector heads 20 laterally in directions tangential to the subject-receiving aperture 18 along linear tracks or other appropriate guides. Additionally, the detector heads 20 are also independently movable in radial directions with respect to the subject-receiving aperture 18. Optionally, the detector heads 20 selectively cant or tilt with respect to radial lines from the center of the subject-receiving aperture 18. Alternately, a single motor and drive assembly controls movement of all the detector heads 20 individually and/or as a unit.

Being mounted to the rotating gantry 16, the detector heads 20 rotate about the subject-receiving aperture 18 (and the subject when located therein) along with the rotation of the rotating gantry 16. In operation, the detector heads 20 are rotated or indexed around the subject to monitor the emitted radiation from a plurality of directions to obtain a plurality of different angular views.

Each of the detector heads 20 has a radiation-receiving face facing the subject-receiving aperture 18 that includes a scintillation crystal, such as a large doped sodium iodide crystal, that emits a flash of light or photons in response to incident radiation. An array of photomultiplier tubes receives the light and converts it into electrical signals. A resolver circuit resolves the x, y-coordinates of each flash of light and the energy of the incident radiation. That is to say, radiation strikes the scintillation crystal causing the scintillation crystal to scintillate, i.e., emit light photons in response to the radiation. The photons are directed toward the photomultiplier tubes. Relative outputs of the photomultiplier tubes are processed and corrected to generate an output signal indicative of (1) a position coordinate on the detector head at which each radiation event is received, and (2) an energy of each event. The energy is used to differentiate between various types of radiation such as multiple emission radiation sources, stray and secondary emission radiation, transmission radiation, and to eliminate noise. An image representation is defined by the radiation data received at each coordinate. The radiation data is then reconstructed into an image representation of a region of interest.

Optionally, the detector heads 20 include mechanical collimators 24 removably mounted on the radiation receiving faces of the detector heads 20. The collimators 24 preferably include an array or grid of lead or otherwise radiation-absorbent vanes which restrict the detector heads from receiving radiation not traveling along selected rays in accordance with the data type being collected (i.e., parallel beam, fan beam, and/or cone beam).

One or more radiation sources 30 are mounted across the subject-receiving aperture 18 from the detector heads 20. Optionally, they are mounted between the detector heads 20 or to the radiation receiving faces of opposing detector heads such that transmission radiation from the radiation sources 30 is directed toward and received by corresponding detector heads 20 on an opposite side of the subject-receiving aperture 18. In a preferred embodiment, the collimators 24 employed on the detector heads 20, in effect, collimate the transmission radiation. That is to say, the collimators 24 restrict the detector heads 20 from receiving those portions of transmission radiation not traveling along rays normal (for parallel beam configurations) to the radiation receiving faces of the detector heads 20. Alternately, other collimation geometries are employed and/or the collimation may take place at the source.

In a preferred embodiment, the radiation sources 30 are line sources each extending the axial length of the respective detector heads 20 to which they correspond. Preferably, the lines sources are thin steel tubes filled with radionuclides and sealed at their ends. Alternately, the radiation sources 30 are bar sources, point sources, flat rectangular sources, disk sources, flood sources, a tube or vessel filled with radionuclides, or active radiation generators such as x-ray tubes. Alternately, one or more point sources of transmission radiation may be utilized.

In operation a SPECT scan is performed using the gamma camera 10. Both transmission projections 40 and emission projections 42 are collected via the detector heads 20. Via iterative and/or analytical processing techniques 44, a 3D transmission radiation image or attenuation map 46 is reconstructed from the collected transmission projections 40. The elements of the attenuation map 46 represent the attenuation coefficients of their respective voxels. The emission projections 42 and the attenuation map 46 are utilized by an image processor 100 including a projector/backprojector pair 110 and 140, respectively. Ultimately, the image processor 100 executes an iterative ML-EM algorithm or reconstruction with each iteration including a projection operation and a backprojection operation. Optionally, an ordered subset EM (OS-EM) algorithm or reconstruction is performed. In either case, a 3D image memory 200 which stores voxels and/or other volume data representative of the reconstructed images is selectively sampled by a video processor 202. The video processor 202 retrieves slices, projections, 3D renderings, and other image information from the 3D image memory 200 and appropriately formats an image representation for display on a human viewable display, such as a video monitor 204 or the like.

More specifically, in a preferred embodiment, a first convolver 112 performs a first slice-to-slice blurring procedure (as described in greater detail later herein) on a volume of estimated emission source data stored in the 3D image memory 200. Typically, the estimation initially represents a 3D image of arbitrary uniform intensity (i.e., each data value being the same). In a preferred embodiment, the initial data value of each voxel is estimated as and/or set to 1. In the first slice-to-slice blurring procedure, each of the blurred slices is maintained such that upon completion of the process, a volume of data comprising the individual blurred slices neighboring one another is achieved. The resulting volume of the first slice-to-slice blurring procedure is then voxel-by-voxel multiplied 114 with a volume of attenuation coefficients from the attenuation map 46 to produce a volume of effective scatter source data 116. In this manner, 3D scatter is modeled in the projector 110 via the first slice-to-slice blurring procedure and the multiplication 114. Moreover, by including attenuation factors 48 in the slice-to-slice blurring procedure (as described in greater detail later herein), non-uniform attenuation is also modeled.

In any event, the volume of effective scatter source data 116 is voxel-by-voxel added 118 with the volume of estimated emission source data from the 3D image memory 200. The resulting sum is then subjected to a second slice-to-slice blurring procedure (as described in greater detail later herein) by a second convolver 120. The final slice or layer produced in the second slice-to-slice blurring procedure is the 2D projection output of the projector 110. In a preferred embodiment, previous blurred slices produced in the second slice-to-slice blurring procedure are not maintained or are discarded. In this manner, via the second slice-to-slice blurring procedure, the system geometric point response is modeled in the projector 110. Again, by including attenuation factors 48 in the slice-to-slice blurring procedure, non-uniform attenuation is modeled.

The image processor 100 computes the ratio 130 or otherwise compares views from the emission projections 42 to corresponding views from the projector 110. The projection data ratio from 130 is then backprojected via backprojector 140 and optionally weight to produce a volume of correction factors 150. The backprojector 140 is the complement of the projector 110. The backprojection operation performed by the backprojector 140 is effectively the transpose or adjoint transform of the projection operation performed by the projector 110. The volume of correction factors 150 is voxel-by-voxel multiplied 160 and/or otherwise applied to the estimated image volume stored in the 3D image memory 200 and reloaded therein to thereby update the same. With successive iterations, the estimated image volume in the 3D image memory 200 converges to the actual true image.

Figure 2:
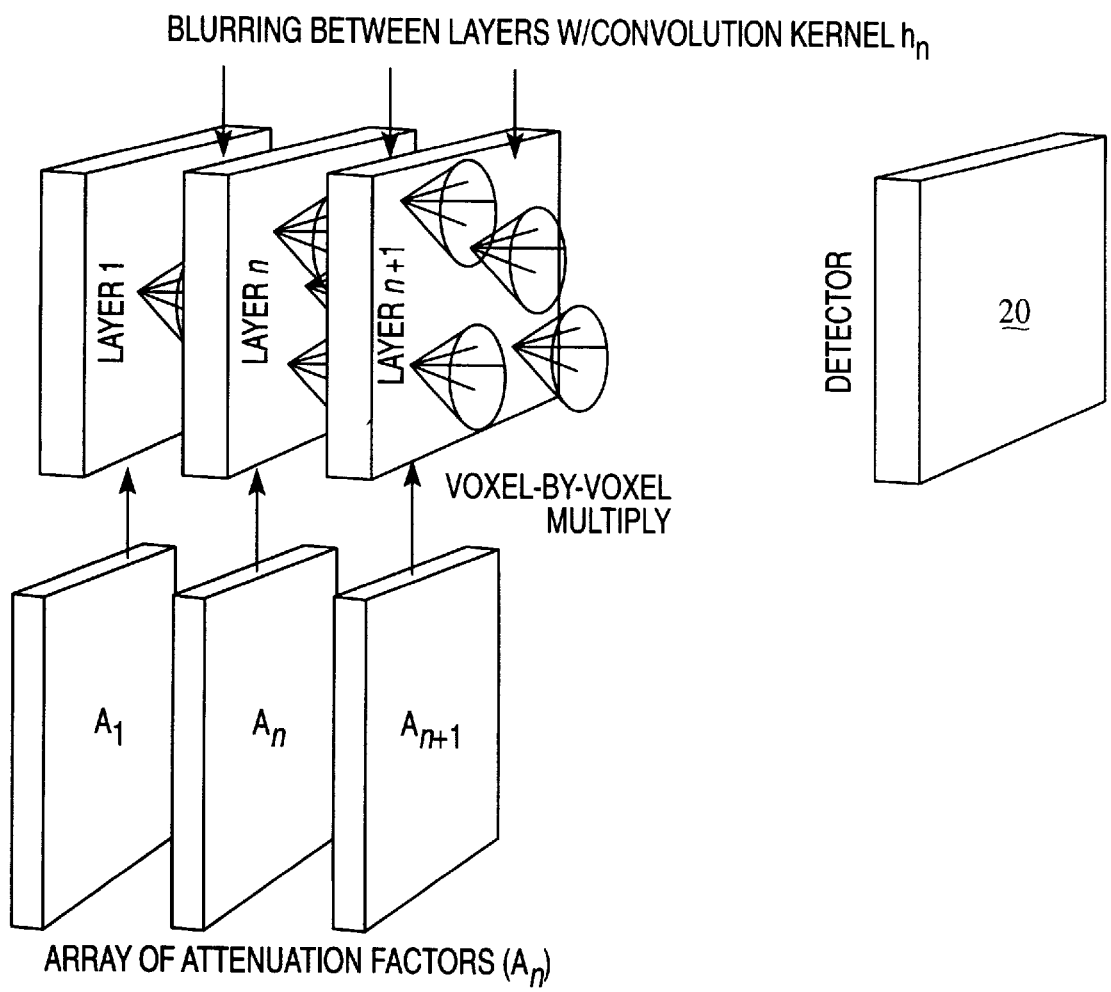
FIG. 2 is a diagrammatic illustration showing a slice-to-slice blurring operation in accordance with aspects of the present invention; and, FIG. 3 is a diagrammatic illustration showing terms modeled in projector/backprojector in accordance with aspects of the present invention.

With reference to FIG. 2 and continuing reference to FIG. 1, the basic procedure used in slice-to-slice blurring is as follows with regard to projection. At each projection view, the voxelized image volume (that is, the 3D grid) rotates with the detector head 20, while the image itself remains in the same orientation. In other words, at each detector angle the 3D grid rotates with the detector head 20, and the 3D image is re-sampled using the rotated grid. A layer is defined to be a slice of the voxelized image volume parallel to the radiation receiving face of the detector head 20. Starting from the layer farthest from the radiation receiving face of the detector head 20, each layer is convolved with a convolution kernel. The resultant 2D image is added to the next layer. In this manner, successive layers are made to contain blurred versions of previous layers. This procedure is repeated until the radiation receiving face of the detector head 20 is reached. Slice-to-slice blurring is mathematically expressed as:

$$\text{proj}=(((((L_1*h_1+L_2)*h_2+L_3)*h_3+L_4)*h_4+\ldots L_{n-1})*h_{n-1}+L_n)*h_n) \quad (1)$$

where $L_n$ is the nth layer; $h_n$ is the blurring kernel for the nth layer; and, "*" is the 2D convolution operator.

Where attenuation correction is to be included, before the convolution is performed, each pixel in the current layer is scaled by its own corresponding attenuation factor from the set of attenuation factors 48 derived from the attenuation map 46. Slice-to-slice blurring with attenuation modeling is mathematically expressed as:

$$\text{proj}=(((((((((L_1 xA_1)*h_1+L_2)\ xA_2)*h_2+L_3)xA_3)*h_3+L_4)xA_4*h_4\ldots L_{n-1})xA_{n-1})*h_{n-1}+L_n)xA_n)*h_n) \quad (2)$$

where $A_n$ is the 2D array of attenuation factors 48 in the nth layer, and "x" is the point-by-point multiplication. Each element in $A_n$ is an exponential function whose exponent is the negative of the linear attenuation coefficient times the length between respective voxel centers.

In a preferred embodiment, the convolution kernels between layers is kept small. Thus, the projector/backprojector with an incremental slice-to-slice blurring model is very efficient in an iterative algorithm. The small kernels are usually 3×3 or 5×5 squares and are preferably implemented as two one-dimensional (1D) convolutions of size 3 or 5 to reduce computation time. The two 1D convolutions are in orthogonal horizontal and vertical directions, respectively. The kernels also optionally have the shape of a cross.

Figure 3:
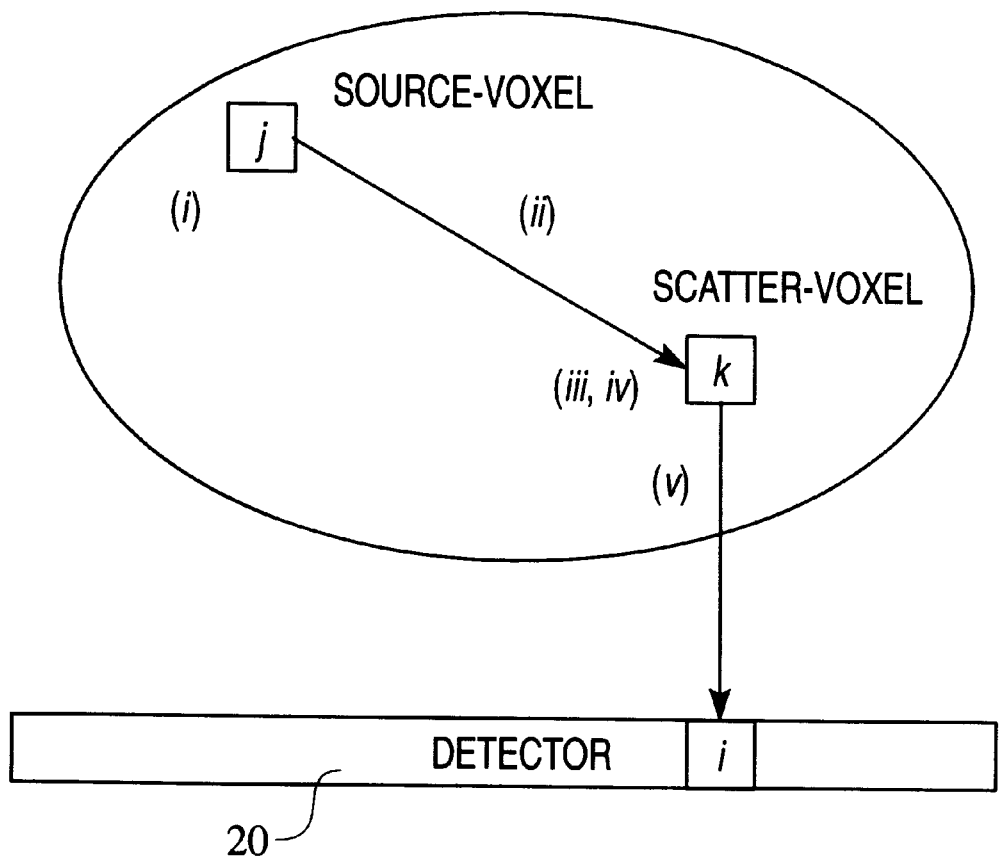

With reference to FIG. 3 and continuing reference to FIGS. 1 and 2, the probability of detection of a first-order scatter photon from a photon that is emitted in a given source voxel and scattered in a given scatter voxel is proportional to (i) activity in the source-voxel, (ii) the attenuation factor from the source-voxel to the scatter-voxel, (iii) the attenuation coefficient of the scatter-voxel, (iv) a function of Compton scatter angle, and (v) the attenuation factor from the scatter-voxel to the detector. This is mathematical expressed as follows:

$$S_{ij} = A_j \sum_k G(\phi_k) \mu_k e^{-\int_j^k \mu_x dx} e^{-\int_k^i \mu_x dx}, \quad (3)$$

where $S_{ij}$ is the number of scattered events detected in projection bin, i, originating form a source voxel, j, and $\mu_k$ is the attenuation coefficient at scattering site, k. The Gaussian scattering probability G ($\phi_k$) is a function of the scattering angle, $\phi_k$ and is in the form of $G(\phi_k) = A \exp[-(\phi_k - p)^2 / w^2]$. The parameters A, p, and w are determined by a least-squares fit of calculated projections to Monte Carlo projections, using a point source in the center of a phantom.

The aforementioned slice-to-slice blurring technique is used to approximate equation (3). The approximation is based on the fact that a series of convolutions of small kernels results in a Gaussian function. The combination of terms $G(\phi_k)$ and $$\exp\left(-\int_j^k \mu_x dx\right)$$

is approximated with small kernel, slice-to-slice blurring, where the local voxel is multiplied by its attenuation factor before the convolution is performed, as described in equation (2). Equation (2) is a model for distance dependent response (i.e., different $h_n$ for each slice dependent on its distance from the radiation receiving face of the detector head 20). In a preferred embodiment for the scatter model of the present invention, however, the small kernels are the same, that is, $h_1 = h_2 = h_3 = \ldots h_n$. For example, the small kernel is a constant A time the following 2D convolution kernel:

| $c^2/a$ | $bc/a$ | c | $bc/a$ | $c^2/a$ |
|---|---|---|---|---|
| $bc/c$ | $b^2/a$ | b | $b^2/a$ | $bc/c$ |
| c | b | a | b | c |
| $bc/c$ | $b^2/a$ | b | $b^2/a$ | $bc/c$ |
| $c^2/a$ | $bc/a$ | c | $bc/a$ | $c^2/a$ |

In a preferred embodiment, a simple model is chosen where $b = a^2$ and $c = a^2$ such that there are only two parameters to be estimated: A and a. To estimate these parameters, Monte Carlo simulations are first performed using point sources (one source at a time) and a 3D MCAT torso attenuation map. The parameters are obtained by the best least-squares fit between the Monte Carlo projections and the calculated diffusion projections.

For example, two different point sources are used at different locations to generate the Monte Carlo projections and calculate diffusion projections; both projections are in 64×64 arrays with 120 view taken over 360 degrees. Parameter A is set to be the ratio of total scatter counts to the total primary counts. Projection data from both point source studies are used in the least-square fit, and the optimal value for a is 0.9 from the least-squares fit.

The implementation procedure of the projector 110 is as follows. In step 1, the estimated image is slice-to-slice blurred or diffused towards the detector, as described above. After the diffusion reaches the detector, all the layers are to be used to generate the scattered photons. The diffusion kernel used in this step is 5×5 and implemented as two orthogonal 1D kernels:

| $c/a^{1/2}$ | | | | | | | | | $c^2/a$ | $bc/a$ | c | $bc/a$ | $c^2/a$ |
|---|---|---|---|---|---|---|---|---|---|---|---|---|---|
| $b/a^{1/2}$ | | | | | | | | | $bc/c$ | $b^2/a$ | b | $b^2/a$ | $bc/c$ |
| $a^{1/2}$ | * | $c/$ | $b/$ | $a^{1/2}$ | $b/$ | $c/$ | = | | c | b | a | b | c |
| $b/a^{1/2}$ | | $a^{1/2}$ | $a^{1/2}$ | | $a^{1/2}$ | $a^{1/2}$ | | | $bc/c$ | $b^2/a$ | b | $b^2/a$ | $bc/c$ |
| $c/a^{1/2}$ | | | | | | | | | $c^2/a$ | $bc/a$ | c | $bc/a$ | $c^2/a$ |

The Gaussian function $G(\phi_k)$ is used to evaluate the kernels. Each voxel is multiplied by the attenuation factor $\exp(-\int \mu_x dx)$ prior to blurring. Therefore, step 1 implements the $G(\phi_k) \exp(-\int \mu_x dx)$ part of equation (3). In step 2, the resultant volume from step 1 is multiplied by the volume of attenuation coefficients, $\mu_k$, in voxel-by-voxel manner. Step 2 implements the part of multiplication by $\mu_k$ in equation (3). In step 3, the results of step 2 are voxel-by-voxel added to the estimated image. The estimated image now represents primary emission source data combined with effective scatter source data. In step 4, if no depth-dependent system geometric point response correction is employed, this step simply evaluates the ray-sum of the resultant volume from step 3 with modeling of attenuation effects, that is, incorporation of the attenuation factor $$\exp\left(-\int_k^i \mu_x dx\right).$$

Note that no system geometric response effects are considered in equation (3). If, however, the system geometric point response is to be modeled, as in a preferred embodiment of the invention herein, this step involves a slice-to-slice blurring operation which is performed on the resultant volume from step 3, in accordance with equation (2), where the attenuation factors are given by $\exp(-\int \mu_x dx)$. The convolution kernels in this blurring operation are determined by the system geometric point response function. The final resulting slice is the projection of the image of estimated emission point sources and first-order scattered photons.

As discussed above, this scatter projection model uses the slice-to-slice blurring method two times. The first time, the convolution kernels are determined by the Compton scatter angle function, $G(\phi_k)$; the second time, the convolution kernels are determined by the system geometric point response function in the usual way. The projector diffuses forward; the backprojector diffuses backward through the voxelized image volume.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of modeling 3D first-order scatter, non-uniform attenuation, and 3D system geometric point response in an ML-EM algorithm to reconstruction SPECT data comprising:
   (a) performing an initial slice-to-slice blurring on a volume of estimated emission source data, said volume of estimated emission source data being represented by a 3D array of voxels;
   (b) voxel-by-voxel multiplying step (a) results by a volume of attenuation coefficients to produce a volume of effective scatter source data;
   (c) voxel-by-voxel adding the volume of effective scatter source data to the volume of estimated emission source data to produce a volume of combined estimated emission and scatter source data; and,
   (d) performing a secondary slice-to-slice blurring on the volume of combined estimated emission and scatter source data.

2. A method of medical imaging comprising:
   (a) performing an initial slice-to-slice blurring on a volume of estimated emission source data by successively convolving parallel slices of the volume of estimated emission source data with respective blurring kernels, and successively adding previously convolved neighboring slices to their immediately following slices prior to that following slices' convolution;
   (b) voxel-by-voxel multiplying step (a) results by a volume of attenuation coefficients to produce a volume of effective scatter source data;
   (c) voxel-by-voxel adding the volume of effective scatter source data to the volume of estimated emission source data to produce a volume of combined estimated emission and scatter source data; and,
   (d) performing a secondary slice-to-slice blurring on the volume of combined estimated emission and scatter source data.

3. The method according to claim 2, wherein after addition of the previously convolved neighboring slice and before its own convolution, slices are point-by-point multiplied by a 2D array of attenuation factors.

4. The method according to claim 3, wherein the attenuation factors are exponential functions whose exponent is a negative of a linear attenuation coefficient times a distance between respective voxels.

5. The method according to claim 2, wherein each convolution is implemented as two orthogonal 1D convolutions.

6. The method according to claim 2, wherein the convolutions approximate a Gaussian scattering probability which is a function of a scattering angle.

7. The method according to claim 6, wherein the blurring kernels are estimated from a least-squares fit comparison of calculated results to projections from known point sources taken one point source at a time using Monte Carlo simulations.

8. A method of medical imaging comprising:
   (a) performing an initial slice-to-slice blurring on a volume of estimated emission source data;
   (b) voxel-by-voxel multiplying step (a) results by a volume of attenuation coefficients to produce a volume of effective scatter source data;
   (c) voxel-by-voxel adding the volume of effective scatter source data to the volume of estimated emission source data to produce a volume of combined estimated emission and scatter source data; and,
   (d) performing a secondary slice-to-slice blurring on the volume of combined estimated emission and scatter source data by successively convolving parallel slices of the volume of combined estimated emission and scatter source data with respective blurring kernels, and successively adding previously convolved neighboring slices to their immediately following slices prior to that following slices' convolution.

9. The method according to claim 8, wherein after addition of the previously convolved neighboring slice and before its own convolution, slices are multiplied by a 2D array of attenuation factors in a point-by-point manner.

10. The method according to claim 9, wherein the attenuation factors are exponential functions whose exponent is a negative of a linear attenuation coefficient times a distance between respective voxels.

11. The method according to claim 8, wherein the blurring kernels are cross shaped.

12. The method according to claim 8, wherein the convolutions approximate a system geometric point response function, said system geometric point response function being dependent on physical characteristics of a collimator used during collection of the SPECT data.

13. A projector/backprojector for use in an image processor employing an EM reconstruction algorithm comprising:
   a first convolver which successively convolves parallel slices of a volume of image data and adds them to neighboring slices prior to the neighboring slices being convolved, said first convolver employing convolution kernels determined from a Compton scattering function which is a function of a scattering angle;
   a multiplication processor which voxel-by-voxel multiplies a volume of image data from the first convolver by a volume of attenuation coefficients; and,
   a second convolver which successively convolves parallel slices of a volume of image data from the multiplication processor and adds them to neighboring slices prior to the neighboring slices being convolved, said second convolver employing convolution kernels determined from a system geometric point response function which depends on physical characteristics of a collimator used during collection of measured data.

14. The projector/backprojector according to claim 13, wherein the first and second convolvers point-by-point multiply a corresponding 2D array of attenuation factors with each of the slices prior to its convolution and after addition of its prior convolved neighboring slice.

15. The projector/backprojector according to claim 14, wherein the attenuation factors represent exponential functions whose exponent is a negative of a negative of a linear attenuation coefficient times a distance between respective voxels.

16. A projector/backprojector for use in an image processor employing, said projector/backprojector comprising:
   first convolving means for performing a first slice-to-slice blurring operation on a volume of estimated emission source data;
   a multiplication processor which voxel-by-voxel multiplies an output from the first convolver by a volume of attenuation coefficients to produce a volume of effective scatter source data;

an adder which adds the volume of effective scatter source data to the volume of estimated emission source data; and, a second convolving means for performing a second slice-to-slice blurring operation on a volume of data output from the adder.

* * * * *